J. T. HAWKINS.
Tools for Making Button Molds.

No. 143,073.    Patented September 23, 1873.

Witnesses:
A. W. Almqvist
D. Sedgwick

Inventor:
J. T. Hawkins
Per Munn & Co.
Attorneys.

UNITED STATES PATENT OFFICE.

JOHN T. HAWKINS, OF SALISBURY, VERMONT.

IMPROVEMENT IN TOOLS FOR MAKING BUTTON-MOLDS.

Specification forming part of Letters Patent No. 143,073, dated September 23, 1873; application filed August 23, 1873.

*To all whom it may concern:*

Be it known that I, JOHN T. HAWKINS, of Salisbury, in the county of Addison and State of Vermont, have invented a new and Improved Tool for Making Button-Molds, of which the following is a specification:

My invention consists of a chuck, with a conical cavity in the end, terminating in a cylindrical socket, and having a roughing-tool in the conical cavity, a finishing-tool in the cylindrical socket, and also a center-bit, all so arranged that a square stick, being presented to the conical cavity and the roughing-knife, will be turned down smooth and to the size of the required button-mold, and then turned off upon the end by the finishing-cutter to the required oval form for the top of the button-mold, after which the stick is presented to a saw and the mold cut off.

Figure 1:
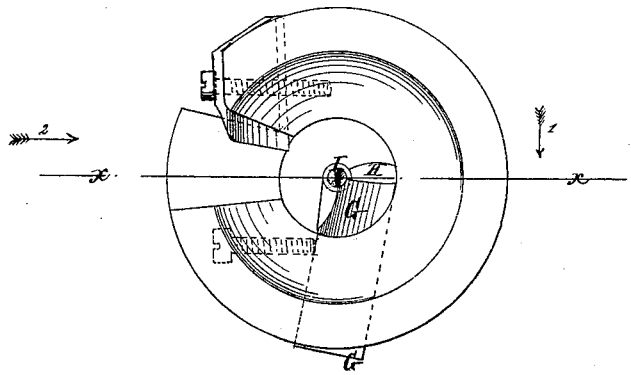
Figure 2:
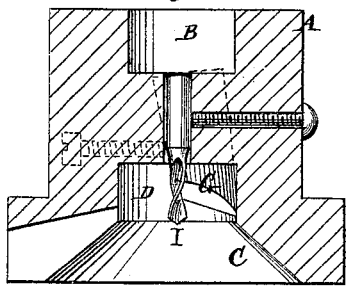
Figure 3:
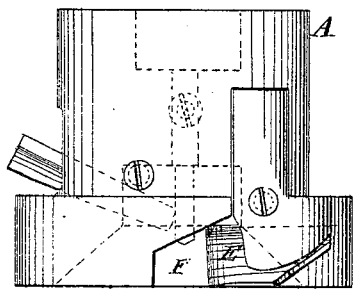

Figure 1 is a front view of my improved tool. Fig. 2 is a sectional elevation of Fig. 1, looking in the direction indicated by arrow 1; and Fig. 3 is a side elevation, looking in the direction of arrow 2.

Similar letters of reference indicate corresponding parts.

A represents the chuck, of cast-iron or other metal, fitted with a socket, B, to connect it with the mandrel of a lathe, in the ordinary arrangement of chucks. C is the conical socket in the front end, and D is the cylindrical socket at the bottom of the conical socket. E is the roughing-cutter, fixed in a notch or throat, F, cut through the side of the chuck into the conical socket, so as to dress off the stick to the size required for the button-mold, which is a little less than the size of the cylindrical socket D. G is the finishing-tool. It is fitted in a throat in the side of the chuck, so as to extend into the cylindrical socket, and so that the cutting-edge H extends from the periphery of the socket to the center-bit I; and said cutter is curved on the face, as shown in Figs. 1 and 3, and beveled, as shown in Fig. 2, so as to finish the end of the stick in the desired oval form for the back of the mold. The boring-bit makes the hole in the center of mold. After each mold is formed and bored on the stick, the latter is removed to a cutting-off saw, and the end is sawed off the right length to make a mold.

Having thus described my invention, I claim as new and desire to secure by Letters Patent—

The chuck A, having the conical socket C, cylindrical socket D, cutters E and G, and the center-bit I, combined and arranged substantially as specified.

JOHN THOMAS HAWKINS.

Witnesses:
L. N. WATERHOUSE,
E. H. WEEKS.